(12) United States Patent
Nakahara et al.

(10) Patent No.: US 8,449,862 B2
(45) Date of Patent: May 28, 2013

(54) METHOD FOR PRODUCING HYDROGEN

(75) Inventors: Masaru Nakahara, Shiga (JP);
Nobuyuki Matsubayashi, Kyoto (JP);
Yoshiro Yasaka, Kyoto (JP)

(73) Assignee: Masaru Nakahara, Otsu-shi (JP)

( * ) Notice: Subject to any disclaimer, the term of this patent is extended or adjusted under 35 U.S.C. 154(b) by 29 days.

(21) Appl. No.: 13/056,036

(22) PCT Filed: Jul. 28, 2009

(86) PCT No.: PCT/JP2009/063427
§ 371 (c)(1),
(2), (4) Date: Mar. 16, 2011

(87) PCT Pub. No.: WO2010/013712
PCT Pub. Date: Feb. 4, 2010

(65) Prior Publication Data
US 2011/0158899 A1  Jun. 30, 2011

(30) Foreign Application Priority Data

Jul. 28, 2008 (JP) .................. 2008-193443

(51) Int. Cl.
*C01B 3/22* (2006.01)
(52) U.S. Cl.
USPC ..................................... 423/648.1
(58) Field of Classification Search
USPC ............................. 423/648.1, 650
See application file for complete search history.

(56) References Cited

U.S. PATENT DOCUMENTS

| 4,992,609 A * | 2/1991 | Maeda et al. ................. 585/509 |
| 2006/0226122 A1 * | 10/2006 | Wojtczak et al. ............... 216/83 |

FOREIGN PATENT DOCUMENTS

| EP | 1 918 247 A1 | 5/2008 |
| FR | 1 228 452 A | 8/1960 |
| JP | 2005-289742 A1 | 10/2005 |
| JP | 2008-514539 A1 | 5/2008 |
| JP | 2008-514694 A1 | 5/2008 |
| JP | 2008-162812 A1 | 7/2008 |
| JP | 2008162812 A * | 7/2008 |

OTHER PUBLICATIONS

Joó "Breakthroughs in Hydrogen Storage—Formic Acid as a Sustainable Storage Material for Hydrogen", ChemSusChem 2008, 1, 805-808.*
International Search Report for International Application No. PCT/JP2009/063427 dated Oct. 1, 2009.
Supplementary European Search Report dated Oct. 27, 2011.
Hiroyuki Ohno and Kenta Fukumoto: "Amino Acid Ionic Liquids", Acc. Chem. Res., vol. 40, No. 11, Nov. 2007, pp. 1122-1129, XP000002659263, abstract table1.
Albert Boddien et al.: "Hydrogen Generation at Ambient Conditions: Application in Fuel Cells", ChemSusChem 2008, 1, pp. 751-758.

\* cited by examiner

*Primary Examiner* — Wayne Langel
*Assistant Examiner* — Syed Iqbal
(74) *Attorney, Agent, or Firm* — Kratz, Quintos & Hanson, LLP

(57) ABSTRACT

An object of the present invention is to provide a method for producing hydrogen by using formic acid as a feedstock, which provides a solution to problems to be solved for the production of hydrogen on an industrial scale, such as problems of production cost, storability and transportability, and also offers improved convenience. The method for producing hydrogen of the present invention is characterized by heating an ionic liquid containing formic acid. The ionic liquid is preferably an ionic liquid in which a counteranion is a formate anion (i.e., formic acid salt). Such an ionic liquid is, as a medium for the production of hydrogen from formic acid as a feedstock, excellent in terms of reaction selectivity (high-purity hydrogen is produced) and reaction velocity.

4 Claims, 3 Drawing Sheets

METHOD FOR PRODUCING HYDROGEN

TECHNICAL FIELD

The present invention relates to a method for producing hydrogen.

BACKGROUND ART

Unlike fossil fuels such as coal and petroleum (hydrocarbons), hydrogen is a clean fuel that burns to form water without producing greenhouse gases, such as carbon dioxide. Fossil fuels on the earth, which have been naturally used in the past, are getting exhausted today. For this reason, there is an urgent need to establish a method for producing hydrogen as a fuel to be replaced with fossil fuels. Reflecting this background, various research and development activities have been carried out all over the world as is well known, and some excellent methods have already been proposed on the level of laboratory experiments (e.g., a method described in Patent Literature 1 mentioned below, which utilizes catalytic pyrolysis of hydrocarbons using a metal catalyst, etc.). However, for the production of hydrogen on an industrial scale, it is necessary to solve problems of (1) how to produce hydrogen at low cost as a matter of course, (2) how to store it compactly and (3) how to transport it safely. The problems (2) and (3) are particularly difficult to solve, because hydrogen is the smallest and lightest molecule with weak intermolecular interactions. Solutions possible at present include a method to apply high pressure, a method to maintain hydrogen at very-low temperature below the boiling point of hydrogen (−253° C.), a method to use a hydrogen storage alloy, and a method to charge hydrogen in a metal tank at high pressure (e.g., 350 atm to 1000 atm), etc. However none of these methods provides any fundamental solution.

In light of the above-mentioned points, in an attempt to provide a novel method for producing hydrogen as a solution to problems to be solved for the production of hydrogen on an industrial scale, such as problems of production cost, storability and transportability, the present inventors have proposed in Patent Literature 2 a method using an aqueous solution of formic acid as a feedstock, in which formic acid is subjected to hydrothermolysis at a temperature from 250° C. to 600° C. (hydrothermal reaction: reaction in a sealed reaction vessel in which high-temperature and high-pressure water is involved), whereby formic acid is decarboxylated (decarboxylation: $HCOOH \rightarrow H_2 + CO_2$) to produce hydrogen.
Patent Literature 1: JP-A-2003-95605
Patent Literature 2: JP-A-2005-289742

SUMMARY OF INVENTION

Technical Problem

The method for producing hydrogen proposed by the present inventors in Patent Literature 2 allows hydrogen to be produced by a hydrothermal reaction under relatively moderate temperature conditions from formic acid, which is a polar, water-soluble organic compound, and water without using a metal catalyst. The method is thus advantageous in terms of production cost. In addition, according to this method, an aqueous solution of formic acid, which has excellent handleability, can be stored and transported. This paves the way for the on-demand production of a desired amount of hydrogen from an aqueous solution of formic acid for practical use, and the aqueous solution of formic acid as a feedstock for the convenient production of hydrogen serves as a storage tank and/or a carrier ship for hydrogen. Therefore, this method could be an innovative solution to problems to be solved for the production of hydrogen on an industrial scale, such as problems of production cost, storability and transportability. However, in one aspect, this method requires a sealed reaction vessel for hydrothermolysis, and thus is not necessarily advantageous in terms of convenience.

Thus, an object of the present invention is to provide a method for producing hydrogen using formic acid as a feedstock, which provides a solution to problems to be solved for the production of hydrogen on an industrial scale, such as problems of production cost, storability and transportability, and also offers improved convenience.

Solution to Problem

In order to achieve the above object, the present inventors conducted intensive research. As a result, they found that by heating an ionic liquid containing formic acid, even in the absence of a metal catalyst, formic acid is decarboxylated to produce hydrogen.

A method for producing hydrogen of the present invention based on the above findings is, as defined in claim 1, characterized by heating an ionic liquid containing formic acid.

The production method as defined in claim 2 is characterized in that in the production method according to claim 1, an imidazolium-salt-based ionic liquid represented by the following general formula (1) is used as anionic liquid.

[Chem. 1]

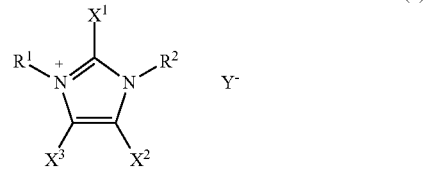

wherein
$R^1$ and $R^2$ are the same or different, and represent an alkyl group with at least one hydrogen atom being optionally substituted with a fluorine atom, or an aryl group with at least one hydrogen atom being optionally substituted with a fluorine atom,
$X^1$, $X^2$ and $X^3$ are the same or different, and represent an alkyl group with at least one hydrogen atom being optionally substituted with a fluorine atom, an aryl group with at least one hydrogen atom being optionally substituted with a fluorine atom, a hydrogen atom, or a fluorine atom, and
$Y^-$ represents a counteranion for an imidazolium cation.

The production method as defined in claim 3 is characterized in that in the production method according to claim 1, a phosphonium-salt-based ionic liquid represented by the following general formula (2) is used as an ionic liquid.

[Chem. 2]

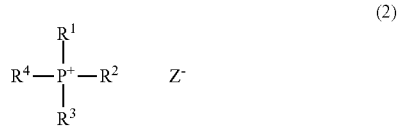

wherein

R¹, R², R³ and R⁴ are the same or different, and represent an alkyl group with at least one hydrogen atom being optionally substituted with a fluorine atom, or an aryl group with at least one hydrogen atom being optionally substituted with a fluorine atom, and Z⁻ represents a counteranion for a phosphonium cation.

The production method as defined in claim 4 is characterized in that in the production method according to claim 1, an ionic liquid in which a counteranion is a formate anion is used as an ionic liquid.

Advantageous Effect of Invention

The present invention provides a method for producing hydrogen by using formic acid as a feedstock, which can solve the problems to be solved for the production of hydrogen on an industrial scale, such as problems of production cost, storability and transportability, and also can offer improved convenience.

DESCRIPTION OF EMBODIMENTS

Figure 1:
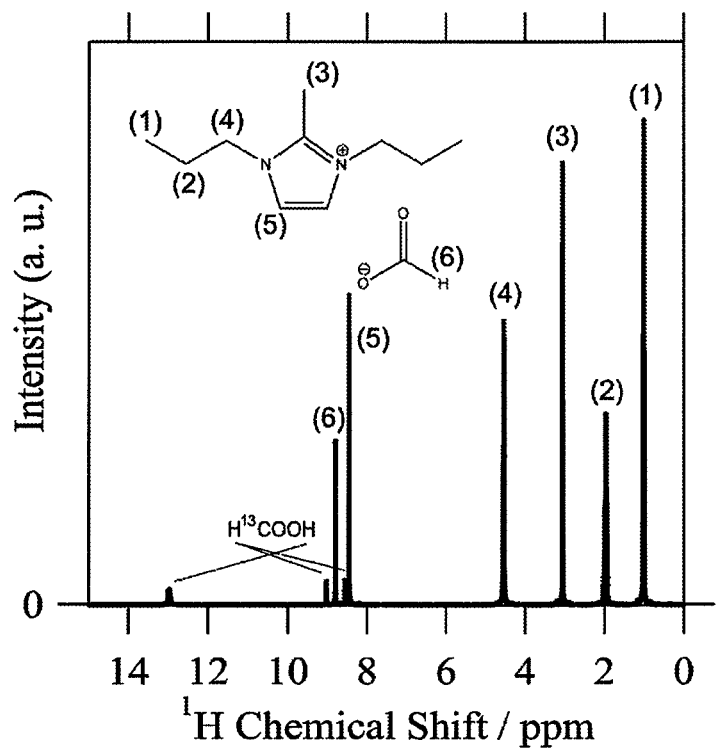
FIG. 1 The ¹H-NMR spectral assignment of ionic liquid No. 4 (1,3-di-n-propyl-2-methylimidazolium formate) used in Example 1.

The method for producing hydrogen of the present invention is characterized by heating an ionic liquid containing formic acid.

In the present invention, an ionic liquid is defined as an organic compound salt having a melting point of not higher than 100° C. Examples thereof include imidazolium-salt-based ionic liquids represented by the following general formula (1), phosphonium-salt-based ionic liquids represented by the following general formula (2), and also pyridinium-salt-based ionic liquids, pyrrolidinium-salt-based ionic liquids and tetraalkylammonium-salt-based ionic liquids.

[Chem. 3]

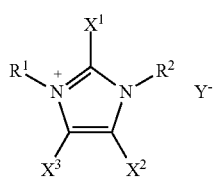

(1)

wherein

R¹ and R² are the same or different, and represent an alkyl group with at least one hydrogen atom being optionally substituted with a fluorine atom, or an aryl group with at least one hydrogen atom being optionally substituted with a fluorine atom, X¹, X² and X³ are the same or different, and represent an alkyl group with at least one hydrogen atom being optionally substituted with a fluorine atom, an aryl group with at least one hydrogen atom being optionally substituted with a fluorine atom, a hydrogen atom, or a fluorine atom, and Y⁻ represents a counteranion for an imidazolium cation.

[Chem. 4]

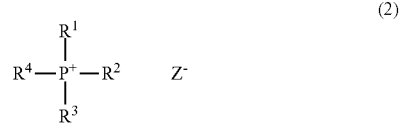

(2)

wherein

R¹, R², R³ and R⁴ are the same or different, and represent an alkyl group with at least one hydrogen atom being optionally substituted with a fluorine atom, or an aryl group with at least one hydrogen atom being optionally substituted with a fluorine atom, and Z⁻ represents a counteranion for a phosphonium cation.

In the above imidazolium-salt-based ionic liquid represented by the general formula (1) and the above phosphonium-salt-based ionic liquid represented by the general formula (2), the alkyl group with at least one hydrogen atom being optionally substituted with a fluorine atom represented by R¹, R², R³, R⁴, X¹, X² and X³ may be, for example, a straight or branched $C_{1-18}$ alkyl group or perfluoroalkyl group. Specific examples thereof include a methyl group, an ethyl group, an n-propyl group, an isopropyl group, an n-butyl group, an isobutyl group, a sec-butyl group, a tert-butyl group, an n-pentyl group, an isopentyl group, an n-hexyl group, an n-octyl group, an n-decyl group, an n-dodecyl group, an n-tetradecyl group, an n-octadecyl group, a trifluoromethyl group, a pentafluoroethyl group, a heptafluoro-n-propyl group, a heptafluoroisopropyl group and a nonafluoro-n-butyl group.

Examples of aryl group with at least one hydrogen atom being optionally substituted with a fluorine atom include a phenyl group and a pentafluorophenyl group.

Examples of Y⁻ as a counteranion for an imidazolium cation and Z⁻ as a counteranion for a phosphonium cation include halide ion such as chloride ion (Cl⁻), bromide ion (Br⁻) and iodide ion (I⁻), and also methanesulfonate anion ($CH_3SO_3^-$), trifluoromethanesulfonate anion ($CF_3SO_3^-$), bis (trifluoromethanesulfonyl)imide anion ($(CF_3SO_2)_2N^-$), formate anion ($HCO_2^-$), and the like.

A preferred example of the ionic liquid is an ionic liquid in which counteranion is a formate anion (i.e., a formic acid salt), which is, as a medium for the production of hydrogen by using formic acid as a feedstock, excellent in terms of reaction selectivity (high-purity hydrogen is produced) and reaction velocity. An ionic liquid in which a counteranion is a formate anion can be synthesized, for example, from an ionic liquid in which a counteranion is a different anion from a formate anion such as bromide ion, by an anion exchange method using a strong-basic ion exchange resin (Biomacromolecules, Vol. 7, 3295-3297, 2006). Various kinds of ionic liquids in which a counteranion is a different anion from a formate anion are commercially available. Ionic liquids which is not commercially available can be synthesized, for example, in accordance with the method described in Ionic Liquids in Synthesis I, Wiley-VCH, 2007.

The ratio in a mixture of formic acid and an ionic liquid is preferably 5:1 to 1:15 (in molar ratio). When the ratio of formic acid to the ionic liquid is too low, the amount of hydrogen produced may be decreased, and when the ratio of formic acid to the ionic liquid is too high, formic acid may undergo decarbonylation ($HCOOH \rightarrow H_2O+CO$) preferentially compared to decarboxylation and efficiency of hydrogen production may be reduced.

The temperature for heating the ionic liquid containing formic acid is preferably 100° C. to 250° C., and more preferably 130° C. to 220° C. When the heating temperature is lower than 100° C., the rate of decarboxylation of formic acid may be decreased, and when the heating temperature is higher than 250° C., the ionic liquid may be decomposed. The heating time is, for example, 10 minutes to 100 hours. Hydrogen produced in the reaction system can be purified by using a hydrogen separation membrane formed of, for example, a ceramic membrane, a metal membrane, or the like.

According to the method for producing hydrogen of the present invention, hydrogen can be conveniently produced without using a metal catalyst, but the method for producing hydrogen of the present invention does not exclude the use of a metal catalyst. By using a metal catalyst, hydrogen can be produced at a high production rate even when the heating temperature is lower by 50° C. or more than the preferred heating temperature in comparison with the case where no metal catalyst is used (e.g., even when the heating temperature is 50° C.) Examples of the metal catalysts include simple salts (chlorides, oxides, etc.) and complexes (specific examples of ligands: amines, phosphines, conjugated dienes, etc.) of transition metals (Ru, Rh, Ir, etc.) in groups 8, 9 or 10 of the periodic table. The amount of a metal catalyst used may be, for example, 0.1 to 3% of the total weight of formic acid and the ionic liquid.

EXAMPLES

Hereinafter, the present invention will be explained in more detail with reference to the Examples, but the scope of the present invention is not limited to the following descriptions.

Example 1

Experimental Method

A reaction vessel (volume: 0.49 mL) formed of a quartz tube (10 cm length×2.5 mm inner diameter) was charged with 0.29 mL of a reaction solution prepared by mixing formic acid with an ionic liquid (water content: less than 2%) in a predetermined ratio (molar ratio). The tube was then sealed with a burner. In a high-temperature NMR probe, the reaction vessel charged with the above mentioned reaction solution was heated to a predetermined temperature, and formic acid in the ionic liquid was quantified in real time by using $^1$H-NMR. After the lapse of a predetermined period of reaction time, a liquid phase portion and a gas phase portion in the reaction vessel were analyzed respectively by using $^1$H-NMR and $^{13}$C-NMR. Table 1 shows the kinds of ionic liquids used, and Table 2 shows the experimental conditions.

TABLE 1

| | Kinds of Ionic Liquids[1] | | | | | | | | |
|---|---|---|---|---|---|---|---|---|---|
| No. | $R^1$ | $R^2$ | $R^3$ | $R^4$ | $X^1$ | $X^2$ | $X^3$ | $Y^-$ | $X^-$ |
| 1 | Me | n-Bu | — | — | H | H | H | $HCOO^-$ | — |
| 2 | Me | n-Bu | — | — | Me | H | H | $HCOO^-$ | — |
| 3 | n-Pr | n-Pr | — | — | Me | H | H | $Br^-$ | — |
| 4 | n-Pr | n-Pr | — | — | Me | H | H | $HCOO^-$ | — |
| 5 | n-Pr | n-Pr | — | — | Et | H | H | $HCOO^-$ | — |
| 6 | $n-C_6H_{13}$ | $n-C_6H_{13}$ | $n-C_6H_{13}$ | $n-C_{14}H_{29}$ | — | — | — | — | $HCOO^-$ |

Figure 2:
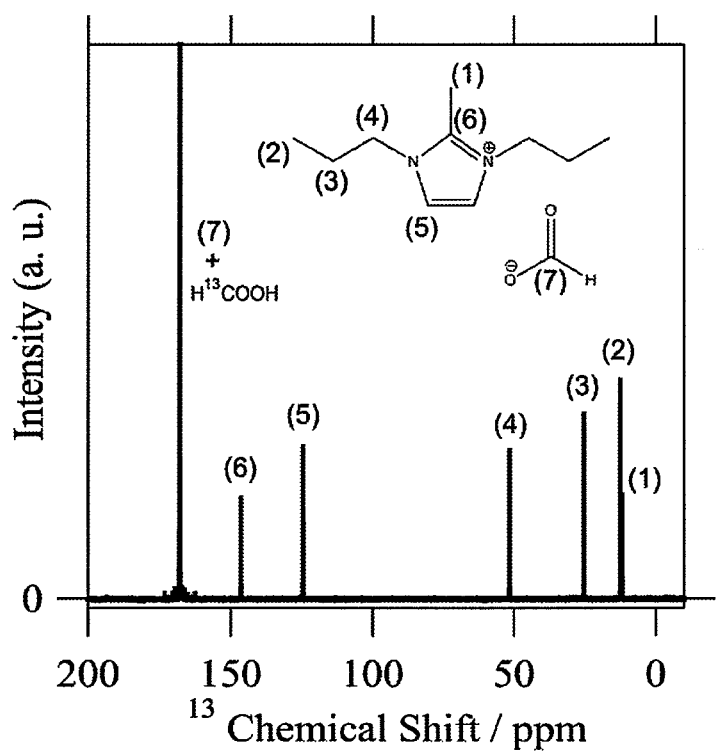
FIG. 2 The ¹³C-NMR spectral assignment thereof.
Figure 3:
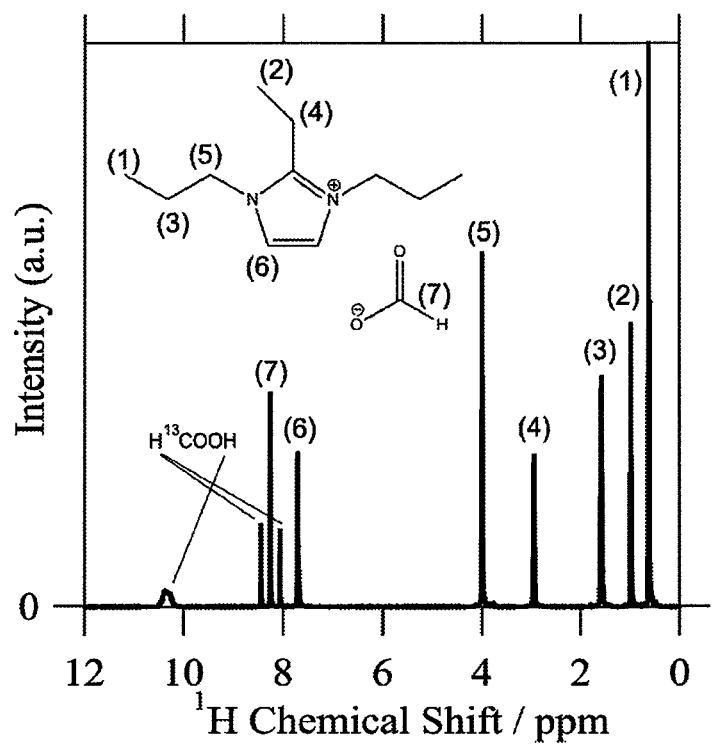
FIG. 3 The ¹H-NMR spectral assignment of ionic liquid No. 5 (1,3-di-n-propyl-2-ethylimidazolium formate).
Figure 4:
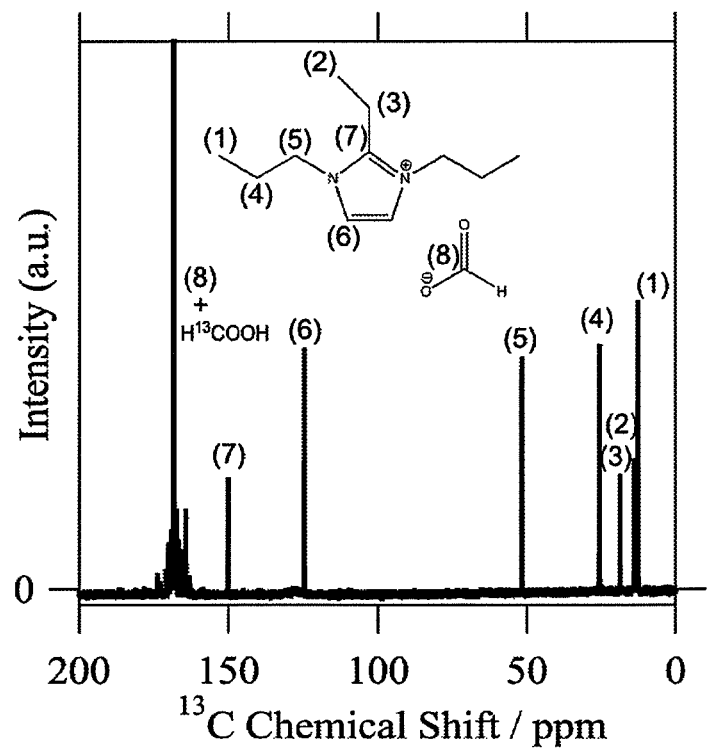
FIG. 4 The ¹³C-NMR spectral assignment thereof.
Figure 5:
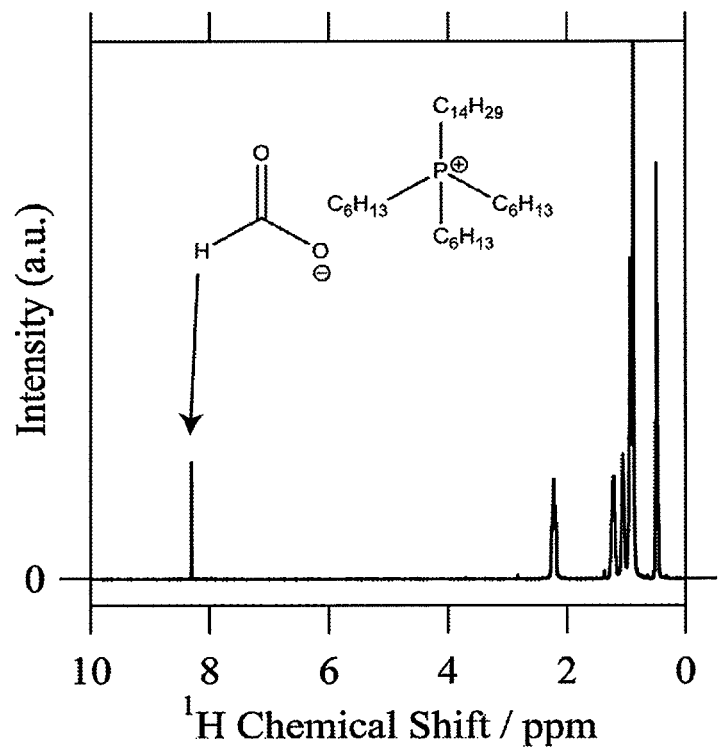
FIG. 5 The ¹H-NMR spectral assignment of ionic liquid No. 6 (tri-n-hexyl-n-tetradecylphosphonium formate).
Figure 6:
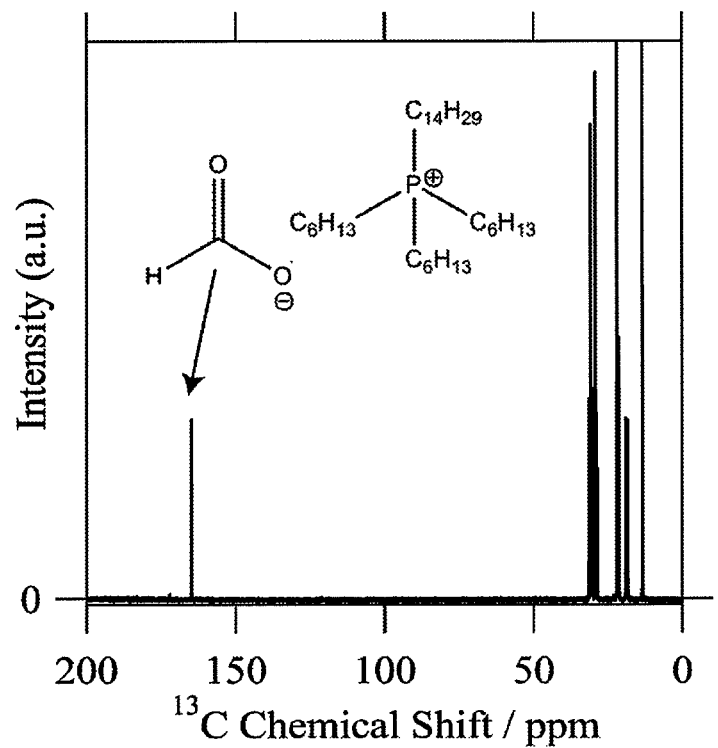
FIG. 6 The ¹³C-NMR spectral assignment thereof.

[1]Each symbol corresponds to a substituent in the general formula (1) and the general formula (2). The formic acid salt ($Y^-$, $Z^- = HCOO^-$) was prepared by anion exchange from a commercially available ionic liquid in which a counteranion is a different anion from a formate anion or an ionic liquid synthesized in accordance with the method described in Ionic Liquids in Synthesis I, Wiley-VCH, 2007. Each ionic liquid has a melting point of not higher than 100° C. (not higher than 60° C. except for ionic liquid No. 3). The $^1$H-NMR and $^{13}$C-NMR spectral assignments of ionic liquids Nos. 4, 5 and 6 are shown in FIGS. 1 to 6.

Experimental Results

The results are shown in Table 2. As shown in Table 2, it was found that hydrogen was produced by heating an ionic liquid containing formic acid, and that the rate of conversion from formic acid to hydrogen could be increased by optimizing the experimental conditions.

with the lapse of time (increase in the dq value), and hydrogen was produced at a high production rate (the catalytic reaction decomposed formic acid into carbon dioxide and hydrogen, and accordingly the amount of formic acid consumed was equal to the amount of hydrogen produced).

TABLE 2

| No. | $q^{1)}$ | Reaction Temperature (°C.) | Reaction Time (min) | $dq^{2)}$ | Conversion Rate from Formic Acid to Hydrogen$^{3)}$ (%:molar basis) | Total $CO_2/H_2{}^{4)}$ (molar ratio) | Total $CO/H_2$ (molar ratio) |
|---|---|---|---|---|---|---|---|
| 1 | 0.66 | 180 | 40 | 0.19 | 2 | 8.7 | 3 |
| 2 | 0.65 | 175 | 160 | 0.45 | 11 | 2.6 | 0.5 |
|   | 1.11 | 175 | 220 | 0.41 | 7 | 2.1 | 1.8 |
| 3 | 0.81 | 200 | 720 | 0.21 | 43 | 1.0 | 0.5 |
| 4 | 0.58 | 180 | 20 | 0.14 | 86 | 1.0 | 0.2 |
|   | 0.89 | 175 | 180 | 0.4 | 65 | 1.3 | 0.01 |
|   | 1.95 | 175 | 120 | 0.12 | 13 | 1.0 | 3 |
| 5 | 0.72 | 180 | 180 | 0.32 | 10 | 9.1 | 0.5 |
|   | 1.52 | 180 | 180 | 0.14 | 20 | 2.3 | 4 |
| 6 | 0.55 | 200 | 60 | 0.08 | 83 | 1.0 | 0.08 |
|   | 1.25 | 200 | 60 | 0.17 | 74 | 1.2 | 0.3 |
|   | 1.94 | 200 | 60 | 0.25 | 37 | 1.0 | 1.2 |

$^{1)}$Molar ratio of formic acid to the ionic liquid.
$^{2)}$Difference in the values of q before and after the reaction.
$^{3)}$Calculated from the amount of formic acid consumed and the determined quantity of hydrogen in the gas phase.
$^{4)}$The number of moles of carbon dioxide is the total value of the gas phase distribution and the liquid phase distribution.

Example 2

Experimental Method

A reaction vessel (volume: 0.20 mL) formed of a quartz tube (4 cm length×2.5 mm inner diameter) was charged with 0.05 mL of a reaction solution which was prepared by mixing formic acid and 1,3-di-n-propyl-2-methylimidazolium formate (ionic liquid No. 4 in Table 1) in a predetermined ratio (molar ratio), and further by adding thereto, as a metal catalyst, $RuCl_2(PPh_3)_4$ in an amount of 1% based on the total weight of the above two components. The tube was then sealed with a burner. In a high-temperature NMR probe, the reaction vessel charged with the above mentioned reaction solution was heated to a predetermined temperature (60° C., 80° C., 105° C.), and the produced hydrogen present in the gas phase portion in the reaction vessel was quantified in real time by using $^1$H-NMR.

Experimental Results

The results are shown in Table 3. As shown in Table 3, it was found that even when the reaction temperature was not higher than 100° C., formic acid was efficiently consumed

TABLE 3

| No. | $q^{1)}$ | Reaction Temperature (°C.) | Reaction Time (min) | $dq^{2)}$ |
|---|---|---|---|---|
| 4 | 0.95 | 105 | 18 | 0.37 |
|   | 0.95 | 105 | 120 | 0.45 |
|   | 0.95 | 105 | 180 | 0.47 |
| 4 | 0.58 | 80 | 15 | 0.08 |
|   | 0.58 | 80 | 120 | 0.15 |
|   | 0.58 | 80 | 180 | 0.16 |
| 4 | 0.64 | 60 | 15 | 0.09 |
|   | 0.64 | 60 | 120 | 0.12 |
|   | 0.64 | 60 | 180 | 0.13 |

$^{1)}$Molar ratio of formic acid to the ionic liquid
$^{2)}$Difference in the values of q before and after the reaction Reference Example 1

Other method for synthesis of 1,3-di-n-propyl-2-methylimidazolium formate (ionic liquid No. 4 in Table 1)

2-Methylimidazole was allowed to react with one equivalent of sodium hydride at room temperature in 1,2-dimethoxyethane as a solvent, and then three equivalents of 1-bromopropane was slowly added thereto, followed by stirring at 60° C. for two days. About one day after the start of stirring, an adequate amount of 2-propanol was added thereto as a co-solvent. After the completion of stirring, the solvent and unreacted 1-bromopropane were distilled off. The residual solid was recrystallized twice from acetone to give 1,3-di-n-propyl-2-methylimidazolium bromide as transparent and colorless crystals (ionic liquid No. 3 in Table 1). Then, 1,3-di-n-propyl-2-methylimidazolium bromide was dissolved in water, and one equivalent of silver sulfate was added thereto, followed by stirring for about 1 hour at room temperature. The resultant precipitate of silver bromide was removed by filtration, and then water was distilled off. The residual solid was recrystallized from acetonitrile to give 1,3-di-n-propyl-2-methylimidazolium sulfate as white fine crystals.

Subsequently, 1,3-di-n-propyl-2-methylimidazolium sulfate was dissolved in water at 80° C., one equivalent of barium formate was added thereto, and the resultant precipitate of barium sulfate was removed by filtration. Water was removed from the aqueous solution of thus obtained 1,3-di-n-propyl-2-methylimidazolium formate at 60° C. under reduced pressure to give the target 1,3-di-n-propyl-2-methylimidazolium formate as a colorless and highly viscous liquid.

Reference Example 2

Other method for synthesis of tri-n-hexyl-n-tetradecylphosphonium formate (ionic liquid No. 6 in Table 1)

Commercially available tri-n-hexyl-n-tetradecylphosphonium chloride was dissolved in methanol, and one equivalent of potassium formate was added thereto. The resultant precipitate of potassium chloride was removed by filtration, and then methanol was distilled off to give the target tri-n-hexyl-n-tetradecylphosphonium formate as a colorless and highly viscous liquid.

INDUSTRIAL APPLICABILITY

According to the present invention, a method for producing hydrogen by using formic acid as a feedstock can be provided, which provides a solution to problems to be solved for the production of hydrogen on an industrial scale, such as problems of production cost, storability and transportability, and also offers improved convenience. In this respect, the present invention is industrially applicable.

The invention claimed is:
1. A method for producing hydrogen in the absence of a metal catalyst, wherein an ionic liquid containing formic acid is heated.
2. The production method according to claim 1, wherein an imidazolium-salt-based ionic liquid represented by the following general formula (1) is used as an ionic liquid:

[Chem. 1]

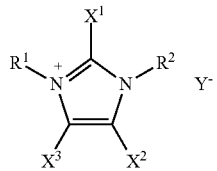

(1)

wherein
$R^1$ and $R^2$ are the same or different, and represent an alkyl group with at least one hydrogen atom being optionally substituted with a fluorine atom, or an aryl group with at least one hydrogen atom being optionally substituted with a fluorine atom;
$X^1$, $X^2$ and $X^3$ are the same or different, and represent an alkyl group with at least one hydrogen atom being optionally substituted with a fluorine atom, an aryl group with at least one hydrogen atom being optionally substituted with a fluorine atom, a hydrogen atom or a fluorine atom; and
$Y^-$ represents a counteranion for an imidazolium cation.
3. The production method according to claim 1, wherein a phosphonium-salt-based ionic liquid represented by the following general formula (2) is used as an ionic liquid:

[Chem. 2]

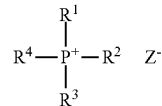

(2)

wherein
$R^1$, $R^2$, $R^3$, and $R^4$ are the same or different, and represent an alkyl group with at least one hydrogen atom being optionally substituted with a fluorine atom, or an aryl group with at least one hydrogen atom being optionally substituted with a fluorine atom; and
$Z^-$ represents a counteranion for a phosphonium cation.
4. The production method according to claim 1, wherein an ionic liquid in which a counteranion is a formate anion is used as an ionic liquid.

* * * * *